United States Patent [19]

Davis

[11] 4,314,400

[45] Feb. 9, 1982

[54] STRAP CUTTER AND METHOD

[76] Inventor: C. Arthur Davis, Rte. 6, Box 137, Ada, Okla. 74820

[21] Appl. No.: 181,149

[22] Filed: Aug. 25, 1980

[51] Int. Cl.[3] ........................ B23P 19/00; B26B 13/00

[52] U.S. Cl. .................................... 29/426.4; 30/246; 30/249; 166/243; 83/54; 83/909

[58] Field of Search ............ 166/244 R, 243; 30/249, 30/250, 251, 296 R, 246; 29/426.4; 83/54, 909, 924

[56] References Cited

U.S. PATENT DOCUMENTS

| | | | |
|---|---|---|---|
| 938,831 | 11/1909 | Deane | 30/249 X |
| 958,587 | 5/1910 | Brooks | 30/246 |
| 1,181,579 | 5/1916 | Dodge | 30/249 |
| 3,352,019 | 11/1967 | Link | 30/246 |
| 3,360,859 | 1/1968 | Watson | 30/249 |
| 3,587,172 | 6/1971 | Link | 30/246 |

*Primary Examiner*—Jimmy C. Peters
*Attorney, Agent, or Firm*—Allen A. Dicke, Jr.

[57] ABSTRACT

A strap cutter is secured to the top structure on an oil well casing and as the discharge pipe supporting a submersible pump is withdrawn, the cutting head of the strap cutter engages with and cuts the straps which secure the pump power cable to the discharge pipe. The strap cutter is manually guided into place but employs the upward motion of the discharge pipe string to supply the cutting force. The method comprises the use of the upward motion to accomplish the cutting step.

11 Claims, 3 Drawing Figures

STRAP CUTTER AND METHOD

BACKGROUND

This invention is directed to a strap cutter for the cutting of straps between the discharge pipe string and the power cable to the submerged electric pump motor as the discharge pipe string is pulled. The method comprises the steps involved in this procedure.

Most subterranean oil must be pumped from the ground. A casing extends from the surface down into the oil pool, and is perforated in the oil-producing zone to permit the oil to flow into the casing. A common oil recovery pump structure, especially found in the older, shallower oil fields, is a surface pump jack which pulls a pump rod which extends to a pump cylinder in the oil adjacent the bottom of the casing. An advantage of this structure is the fact that the motive unit is on the surface, and is easily accessible for maintenance. A disadvantage is the length of the pump rod string, which becomes very long for greater well depths.

Submersible pumps are now widely used for the recovery of oil. They comprise an electric motor-pump combination which is positioned in the lower portion of the casing in the oil pool therein. The discharge pipe string is directly connected to the pump to receive the pumped oil, and the pipe string also serves as a mechanical support for the pump and its motor. Of course, electric power must be supplied to the pump, and this is accomplished by a suitably shielded electric power cable which also extends down the casing, on the outside of the pipe string. In order to support the power cable, it is strapped to the outside of the pipe string with steel band straps.

As the pump is raised for service, the straps are cut. In prior operations, the straps have been manually cut with the use of a hand-carried conventional wire cutter. As the pipe string is raised, sections are removed and set aside in a conventional manner, and the power cable is wound up on an adjacent spool.

The manual cutting of the strapping is dangerous and requires a very low pipe string raising speed. Furthermore, the direct manual operation is dangerous in this close proximity to the moving equipment. Thus, there is need for an improved, safer strap cutter and method.

SUMMARY OF THE INVENTION

In order to aid in the understanding of this invention, it can be stated in essentially summary form that it is directed to a strap cutter and method for cutting strapping which secures submersible pump power cable to the side of its discharge pipe string as the string and cable are withdrawn from an oil well. The strap cutter comprises a relatively fixed member which is manually guided to engage on the strap, and a relatively movable shear blade pivoted thereon, with the shear blade securable to a portion of the casing-mounted structure, so that as the string is raised, the raising motion operates the shear blade to cut the strap. The method comprises the steps involved in this cutting method.

It is thus an object of this invention to provide a strap cutter which permits the operating personnel to stand farther away from the pipe string combination as it is pulled, with a portion of the strap cutter attached to the fixed equipment around the wellhead so that the motion of the pipe string combination as it is raised causes the motion which cuts the strap. In this way, the operator need only engage the strap cutter onto the strap so that raising motion of the pipe string causes cutting action of the strap cutter, to reduce operator fatigue and provide enhanced safety for the operator.

It is another object to provide a strap cutting method which employs the motion of the pipe string being pulled to cause the cutting of the strap to reduce fatigue and enhance safety.

It is another object to provide a strap cutter wherein the straps on a pipe string being pulled for access to a submersible pump can be cut more quickly, with proper cutting being accomplished at near maximum pipe string pulling speeds, to reduce the time involved in well maintenance.

It is a further object to provide such a strap cutter which is durable, to be of long life and for safe handling, together with an economical construction which is of useful general utility.

Other objects and advantages of this invention will become apparent from a study of the following portion of this specification, the claims and the attached drawings.

DESCRIPTION OF THE PREFERRED EMBODIMENT

Figure 2:
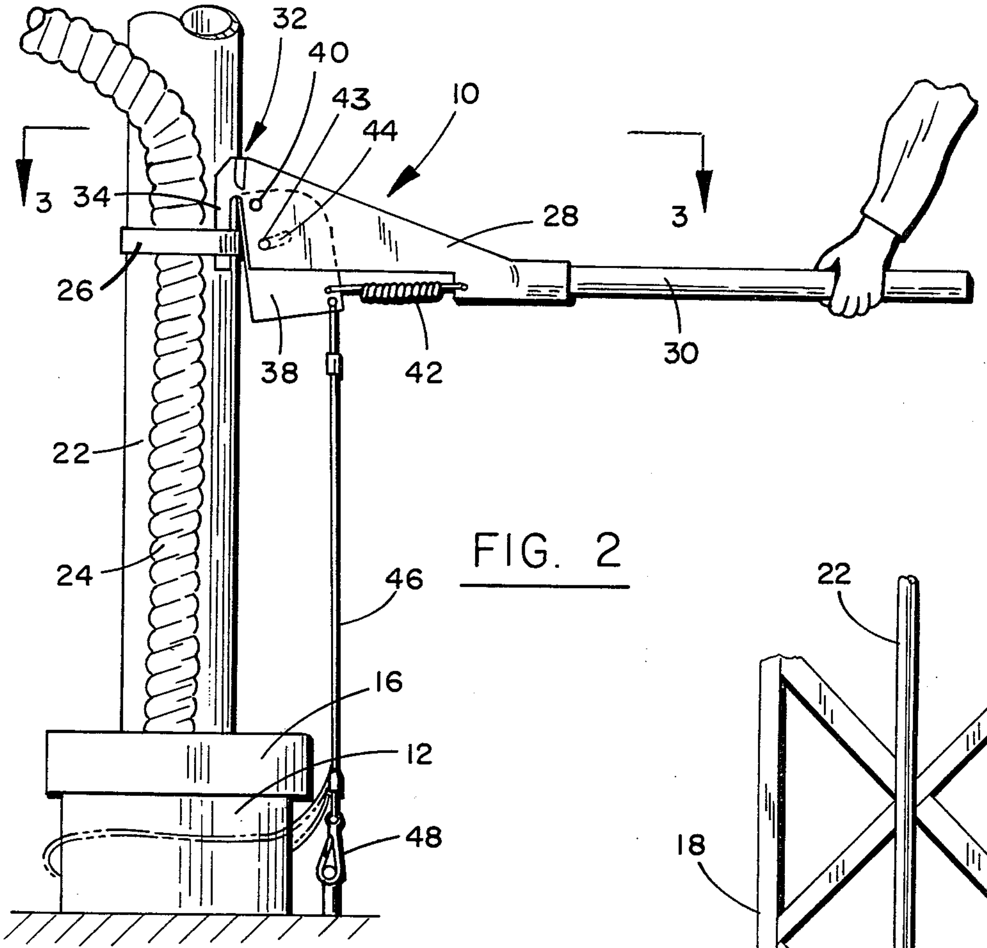
FIG. 2 is an enlarged side elevational detail as indicated at 2—2 of FIG. 1, showing the strap cutter of this invention in side elevation.
Figure 3:
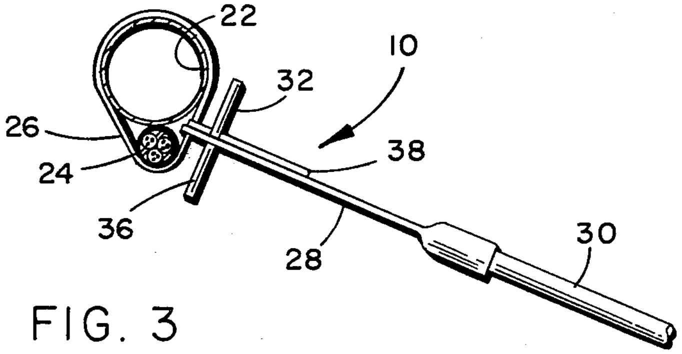
FIG. 3 is a plan view of the strap cutter, as seen along the lines 3—3 of FIG. 2.
Figure 1:
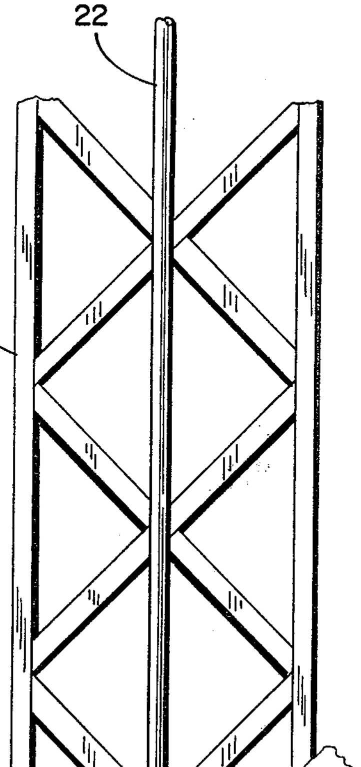
FIG. 1 is a schematic side elevational view, with parts broken away, of an oil wellhead during string pulling and strap cutting operations.
Figure 1:
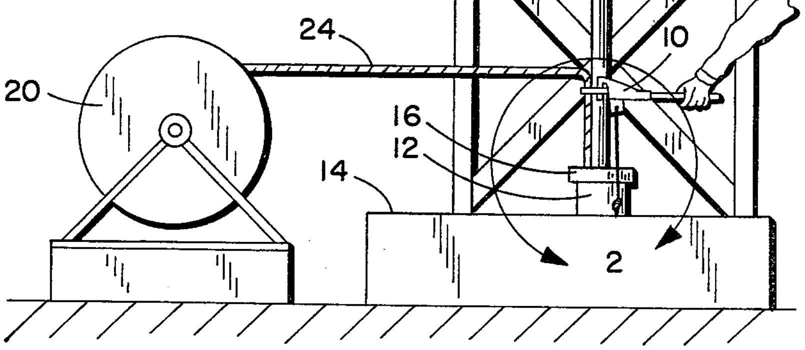

The strap cutter of this invention is generally indicated at 10 in FIGS. 1, 2, and 3. FIG. 1 illustrates an installation where oil is removed from the ground by means of a submersible pump-motor combination submerged in the well casing. Well casing 12 extends up out of the ground from a subterranean zone of interest. Often a work platform 14 is positioned around the casing. A top structure 16 is secured to the top of the casing. The top structure 16 is conventional, and may carry valving, flanges, and the like. Sometimes it is called a "Christmas tree."

When a submersible pump is to be installed or removed, tower 18 is brought to the wellhead. Usually, tower 18 is a portable structure and is used for servicing wells already in production. Similarly, cable reel 20 is a portable structure, optionally on a truck or trailer frame, and is brought to the site as required. The work platform 14 may also be portable, brought to the site with tower 18.

The submersible pump-motor combination is positioned down in well casing 12 and is supported on the pipe string 22 which serves both as a discharge pipe for the pump and as a support for the pump-motor combination. In order to supply electric power to the electric motor, electric power cable 24 extends down into the well casing, together with pipe string 22. In order to support the power cable 24, straps are placed to embrace both the pipe string 22 and electric power cable 24. One of the straps is indicated at 26 and such straps are placed regularly along the length of the pipe string. Straps 26 are positioned from 12 to 24 inches apart along the length of pipe string 22 in order to prevent motion of electric power cable 24 and to support it. The straps 26 are of conventional steel strapping material, and are applied by conventional strapping techniques.

As the pipe string 22 is withdrawn from casing 12 for servicing the pump-motor combination, the straps 26 must be successively cut upon withdrawal of the pipe string. Strap cutter 10 performs this function. Strap cutter 10 has body 28 which serves as the main structural body of the strap cutter. Body 28 has a handle 30 extending therefrom on the end away from the pipe string. Crossbar 32 is positioned at the upper forward corner of body 28, in line with the inside edge of fixed shear blade 34. Fixed shear blade 34 is secured to or formed as part of body 24 and extends downwardly at the forward edge of the body 28. Shear blade 34 is sufficiently narrow in the front to back direction, that is, axially of the handle 30, that it can engage in the substantially triangular space which is created as the strap 26 engages around the cylindrical pipe string 22 and electric power cable 24.

Movable shear blade 38 is pivoted on pivot pin 40 on the side of body 28. The shear edge of movable shear blade 38 is positioned so that it can swing from the angularly outward open position illustrated in FIG. 2 to a point where it, moves past the edge of the fixed shear blade in shearing relationship. Spring 42, engaged between movable shear blade 28 and body 28 urges the movable shear blade to the open position illustrated. Stop pin 43 is fixed in body 28 and engages an elongated stop slot 44 in the movable shear blade to limit the motion of the shear blade in the open and closed directions.

Operating cable 46 is a flexible member which is connected to movable shear blade 38 behind pivot pin 40 and at its lower end has a connector 48 by which the cable can be attached to a fixed portion of the wellhead or adjacent work platform. The mechanical structure is arranged so that when the cable is pulled, the shear is actuated.

When pipe string 24 is being pulled, an operator stands on the platform adjacent wellhead 16. He attaches connector 48 as illustrated and holds the strap cutter 10 so that its fixed shear blade 34 is positioned in space 36. As the pipe string rises, a strap is engaged in the opening behind shear blade 34 and strap cutter 10 is pulled upward by the upward motion of the pipe string. When operating cable 46 tightens, it swings shear blade 38 in the clockwise direction, cutting strip 26 which is engaged between the shear blades. Thus, strap shearing is accomplished without slowing the upward motion of the pipe string and without a worker having to engage a hand tool on the strap and apply cutting force. Thus, operating speed and safety are both enhanced. The method of this invention comprises the steps achieved by the use of this strap cutter in using it in the manner that is described.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A strap cutter comprising:

a body, a manually engagable handle secured to said body, and defining the rear end of said strap cutter, a downwardly directed shear blade on the forward end of said body opposite the rear end thereof;

a movable shear blade movably mounted on said body for movement in shearing relationship to said fixed shear blade from an open position wherein there is a space between said shear blades to a closed position wherein at least a portion of said space is closed;

an operating member connected to said movable shear blade for moving said movable shear blade from the open toward the closed position, said operating member having a connector thereon for attachment of said operating member so that when a member to be cut is positioned between said shear blade and is moved away from said connector, said movable shear blade is actuated for shear cutting.

2. The strap cutter of claim 1 wherein said downwardly directed shear blade is on said body.

3. The strap cutter of claim 2 wherein said movable shear blade is pivoted on said body so that when said operating member is tensioned, said movable shear blade moves into shearing relationship with said fixed shear blade.

4. The strap cutter of claim 3 wherein a spring is interengaged between said movable shear blade and said body to urge said movable shear blade toward the open position wherein it is away from said fixed shear blade.

5. The strap cutter of claim 1 wherein a spring is interengaged between said movable shear blade and said body to urge said movable shear blade toward the open position wherein it is away from said fixed shear blade.

6. The strap cutter of claim 5 wherein said operating member is a flexible cable attached to said movable shear blade and extending downwardly from said body.

7. The strap cutter of claim 6 wherein a cross bar is secured to said body to limit forward motion of said body to prevent said downwardly directed shear blade from engaging too deeply between a pipe string and electric cable for cutting a strap therebetween.

8. The strap cutter of claim 1 wherein a cross bar is secured to said body to limit forward motion of said body to prevent said downwardly directed shear blade from engaging too deeply between a pipe string and electric cable for cutting a strap therebetween.

9. The strap cutter of claim 1 further in combination with a wellhead having a pipe string extending therefrom with an electric power cable strapped to the side of said pipe string so that as said pipe string is raised, said strap cutter successively engages the straps to successively shear the straps so that the pipe string and cable can be separately handled, and wherein said movable shear blade is attached to a fixed member at the wellhead.

10. The method of cutting straps which strap electric power cable to the side of a pipe string in a well as the pipe string is being pulled from the well comprising the steps of:

attaching a movable shear blade to the wellhead;

engaging a shear blade behind the strap securing the electric power cable to the pipe string with the two shear blades in shearing relationship with respect to each other and on opposite sides of the strap to be cut;

pulling the pipe string and the cable out of the well so that pipe string motion causes relative shear blade motion to cut the strap as the pipe string is raised.

11. The method of claim 10 wherein the step of engaging a shear blade behind the strap comprises the manually guided engagement of a fixed shear blade behind the strap;

the step of attaching a shear blade to the wellhead comprises the step of attaching the relatively movable shear blade to the wellhead by a flexible member so that as the pipe string is raised, the flexible member moves the relatively movable shear blade with respect to the manually guided relatively fixed shear blade to shear the strap on the rising pipe string.

* * * * *